(12) United States Patent
Hale

(10) Patent No.: US 12,495,021 B2
(45) Date of Patent: Dec. 9, 2025

(54) HYBRID PKI KEYLOADER METHODS AND SYSTEMS

(71) Applicant: THE UNITED STATES OF AMERICA, AS REPRESENTED BY THE SECRETARY OF THE NAVY, Arlington, VA (US)

(72) Inventor: Britta Hale, Aptos, CA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 84 days.

(21) Appl. No.: 18/672,970

(22) Filed: May 23, 2024

(65) Prior Publication Data

US 2024/0396879 A1    Nov. 28, 2024

Related U.S. Application Data

(60) Provisional application No. 63/468,495, filed on May 23, 2023.

(51) Int. Cl.
*H04L 9/40*    (2022.01)
*H04L 9/00*    (2022.01)

(52) U.S. Cl.
CPC .......... *H04L 63/0428* (2013.01); *H04L 9/006* (2013.01); *H04L 63/061* (2013.01)

(58) Field of Classification Search
CPC .... H04L 63/0428; H04L 9/006; H04L 63/061
USPC ........................................................ 713/171
See application file for complete search history.

(56) References Cited

U.S. PATENT DOCUMENTS

| | | | | |
|---|---|---|---|---|
| 9,614,822 | B2* | 4/2017 | Sakemi | H04L 63/065 |
| 9,674,892 | B1* | 6/2017 | Li | H04L 63/123 |
| 10,397,189 | B1* | 8/2019 | Hashmi | H04L 63/0272 |
| 2016/0316353 | A1* | 10/2016 | Kawakami | H04L 61/5007 |
| 2018/0167867 | A1* | 6/2018 | Speight | H04W 52/0229 |
| 2018/0183772 | A1* | 6/2018 | Jeon | H04L 63/0428 |

OTHER PUBLICATIONS

E. Rescorla. RFC 5705. Keying Material Exporters for Transport Layer Security (TLS). https://www.rfc-editor.org/rfc/rfc5705.html, Mar. 2010.
R. Barnes, B. Beurdouche, R. Roberts, J. Millican, E. Omara, K. Cohn-Gordon. The Messaging Layer Security (MLS) Protocol. Draft 17. https://datatracker.ietf.org/doc/draft-ietf-mls-protocol/17/, Dec. 2022.

* cited by examiner

*Primary Examiner* — Teshome Hailu
(74) *Attorney, Agent, or Firm* — Heber Martin Carbajal Chavez; Scott Bell

(57) ABSTRACT

A method and system for cryptographically securing communication systems between a plurality of communication devices includes manually providing a pre-shared encryption and/or authentication key via one or more key loader devices to the communication devices; deriving a PKI based protocol derived symmetric encryption and/or authentication key; processing the pre-shared encryption and/or authentication key and the PKI based protocol derived symmetric encryption and/or authentication key to generate a combined encryption and/or authentication key; and using the combined encryption and/or authentication key to encrypt and/or authenticate communications between the plurality of communication devices.

6 Claims, 5 Drawing Sheets

HYBRID PKI KEYLOADER METHODS AND SYSTEMS

CROSS REFERENCE TO RELATED PATENT(S) AND APPLICATION(S)

This application claims the benefit of U.S. Provisional Application No. 63/468,495 filed May 23, 2023, and entitled Hybrid PKI Keyloader, which is hereby incorporated in its entirety by reference.

BACKGROUND

Traditionally, military communication systems are secured cryptographically through the use of keys manually supplied by keyloaders (a.k.a. keyfill devices). With reference to FIG. 1, illustrated is a manually loaded key fill/key loader process which includes the steps of manually loading a keyfill/keyloader 101 with a key, and then encrypting and/or authenticating communication channels 106 using the entered key. This process is labor intensive and can incur errors in the manual process. Due to manual overhead in the process, keys are changed infrequently. If the key is compromised by an adversary, all past, present, or future communications protected by such the key are also compromised, leading to a high vulnerability window profile for such systems.

This disclosure, and the exemplary embodiments described herein, describe methods and systems for cryptographically securing communication systems between a plurality of communication devices including the use of a hybrid public key infrastructure (PKI) keyloader. The implementation described herein is related to systems and methods for implementation with a manual key loader device, however it is to be understood that the scope of this disclosure is not limited to such application.

INCORPORATION BY REFERENCE

The following publications are incorporated by reference in their entirety.

[Ref. 1] E. Rescorla. RFC 5705. Keying Material Exporters for Transport Layer Security (TLS). https://www.rfc-editor.org/rfc/rfc5705.html.

[Ref. 2] R. Barnes, B. Beurdouche, R. Roberts, J. Millican, E. Omara, K. Cohn-Gordon. The Messaging Layer Security (MLS) Protocol. Draft 17.

[Ref. 3] J. Hesse, S. Jarecki, H. Krawczyk, and C. Wood. Password-Authenticated TLS via OPAQUE and Post-Handshake Authentication. Advances in Cryptology-Eurocrypt 2023.

[Ref. 4] Viber Encryption Overview. Viber. 3 May 2016. Archived from the original on 11 Jul. 2016. Retrieved 5 May 2024.

[Ref. 5] Newman, Lily Hay (11 Jan. 2018). Skype's Rolling Out End-to-End Encryption For Hundreds of Millions of People. Wired. Archived from the original on 12 Jan. 2018.

[Ref. 6] Omara, Emad (November 2020). Messages End-to-End Encrypted Overview.

[Ref. 7] Wire Security Whitepaper. Wire Swiss GmbH. 3 Mar. 2016.

[Ref. 8] Moxie Marlinspike and Trevor Perrin. The Signal Protocol. Signal.org. November 2016.

[Ref. 9] Wickr's Messaging Protocol. Nov. 7, 2022.

[Ref. 10] Benjamin Dowling and Britta Hale. Authenticated Continuous Key Agreement: Active MitM Detection and Prevention. 2023.

[Ref. 11] Joël Alwen, Sandro Coretti, and Yevgeniy Dodis. The Double Ratchet: Security Notions, Proofs, and Modularization for the Signal Protocol. 2018.

[Ref. 12] Nir Drucker and Shay Gueron. Continuous Key Agreement with Reduced Bandwidth. Cyber Security Cryptography and Machine Learning, CSCML 2019. Lecture Notes in Computer Science, vol 11527. Springer, Cham.

[Ref. 13] Yevgeniy Dodis, Kristiyan Haralambiev, Adriana Lopez-Alt, and Daniel Wichs, Cryptography against Continuous Memory Attacks. In 2013 IEEE 54th Annual Symposium on Foundations of Computer Science, 2010 pp. 511-520.

BRIEF DESCRIPTION

In accordance with one exemplary embodiment of the present disclosure, disclosed is a method for cryptographically securing communication systems between a plurality of communication devices, the method comprising: manually providing a pre-shared encryption and/or authentication key via one or more key loader devices to the communication devices; using a public key infrastructure (PKI) based key exchange protocol, deriving a shared symmetric encryption and/or authentication key; processing the pre-shared encryption and/or authentication key and the key exchange protocol derived shared symmetric encryption and/or authentication key to derive a combined encryption and/or authentication key which is based on a combination of the pre-shared encryption and/or authentication key and the PKI based exchange protocol derived shared symmetric encryption and/or authentication key; and using the combined encryption and/or authentication key to encrypt and/or authenticate communications between the plurality of communication devices, wherein the processing includes processing the keyloader pre-shared encryption and/or authentication key as a pre-shared (PSK) inject into the PKI based key exchange protocol to generate the combined encryption and/or authentication key which is based on the combination of the pre-shared encryption and/or authentication key and the PKI based key exchange protocol derived symmetric encryption and/or authentication key.

In accordance with another exemplary embodiment of the present disclosure, disclosed is a method for cryptographically securing communication systems between a plurality of communication devices, the method comprising: manually providing a pre-shared encryption and/or authentication key via one or more key loader devices to the communication devices; using a public key infrastructure (PKI) based protocol, processing the pre-shared encryption and/or authentication key to initiate the PKI based protocol to generate a combined encryption and/or authentication key based on the pre-shared encryption and/or authentication key; and using the combined encryption and/or authentication key to encrypt and/or authenticate communications between the plurality of communication devices.

In accordance with another exemplary embodiment of the present disclosure, disclosed is a communication system for providing secure communications between a plurality of communication devices, the system comprising: a hybrid PKI key loader (HPKL) system performing a method comprising: manually providing a pre-shared encryption and/or authentication key via one or more key loader devices to the communication devices; and using a public key infrastructure (PKI) based protocol, deriving a symmetric encryption and/or authentication key; and a continuous key agreement (CKA) protocol process performing a method comprising: processing the pre-shared encryption and/or authentication key and the PKI based protocol derived symmetric encryption and/or authentication key to generate a combined encryption and/or authentication key which is based on a combination of the pre-shared encryption and/or authentication key and the PKI based protocol derived symmetric encryption and/or authentication key; and using the combined encryption and/or authentication key to encrypt and/or authenticate communications between the plurality of communication devices, wherein the processing includes processing the pre-shared encryption and/or authentication key as a pre-shared (PSK) inject into the PKI based protocol to generate the combined encryption and/or authentication key which is based on the combination of the pre-shared encryption and/or authentication key and the PKI based protocol derived symmetric encryption and/or authentication key.

BRIEF DESCRIPTION OF THE DRAWINGS

For a more complete understanding of the present disclosure, reference is now made to the following descriptions taken in conjunction with the accompanying drawings.

DETAILED DESCRIPTION

Figure 1:
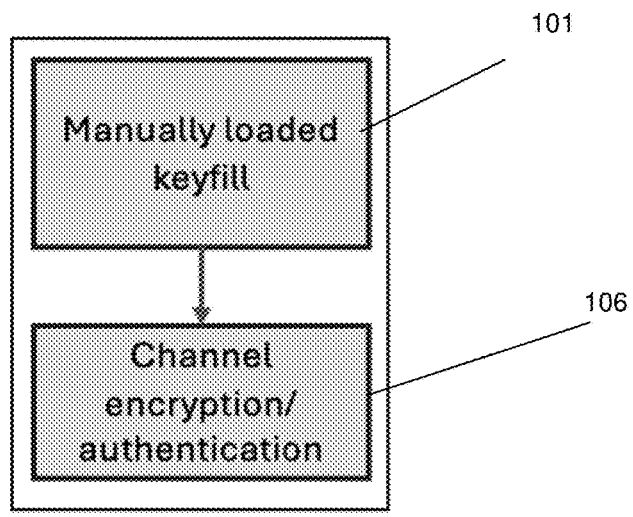
FIG. 1 illustrates a manually loaded key fill/key loader process according to an example embodiment of this disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The term "public key infrastructure (PKI)", as used herein, refers to a set of roles, policies, hardware, software and procedures needed to create, manage, distribute, use, store and revoke digital certificates and manage public key encryption.

The term "key derivation function (KDF)" refers to a cryptographic algorithm that generally derives one or more secret keys from a secret value such as a master key, a password, or a passphrase using a pseudorandom function, such as a cryptographic hash function or block cipher The term "keyloader", or "key loader" as used herein, refers to a device that accepts as an input a manually entered key or manually entered drive, such as but not limited to a flash drive, for encryption and/or authentication of a communication.

This disclosure and exemplary embodiments described herein provide methods and systems for cryptographically securing communication systems between a plurality of communication devices. Specifically, described herein are hybrid PKI keyloader methods and systems for cryptographically securing communication systems between a plurality of communication devices.

Modern public key infrastructure (PKI) systems avoid manual installation of symmetric keys by relying on asymmetric cryptography. This has resulted in significant improvements in usability and speed for establishing secure connections for e.g. internet connections, instant messaging, etc. Such systems frequently rely on an on-device random number generator (RNG) or pseudo random number generator (PRNG) that, if compromised, could be difficult to replace. Hence, communication systems that require elevated levels of reliability, such as military communication systems, that may use manual keyloaders have largely not transitioned to the modern PKI based solutions.

Some PKI based protocols allow for pre-shared key (PSK) usage, where a key is exported from one PKI based protocol and used in another. Such protocols commonly list methods for exporting and deriving such exporter keys and injecting them. [Ref. 1], [Ref. 2] Analysis has also been done on the security of such protocols where PSKs are used [Ref. 3]. These PSKs are exported from other cryptographic protocols.

Figure 2:
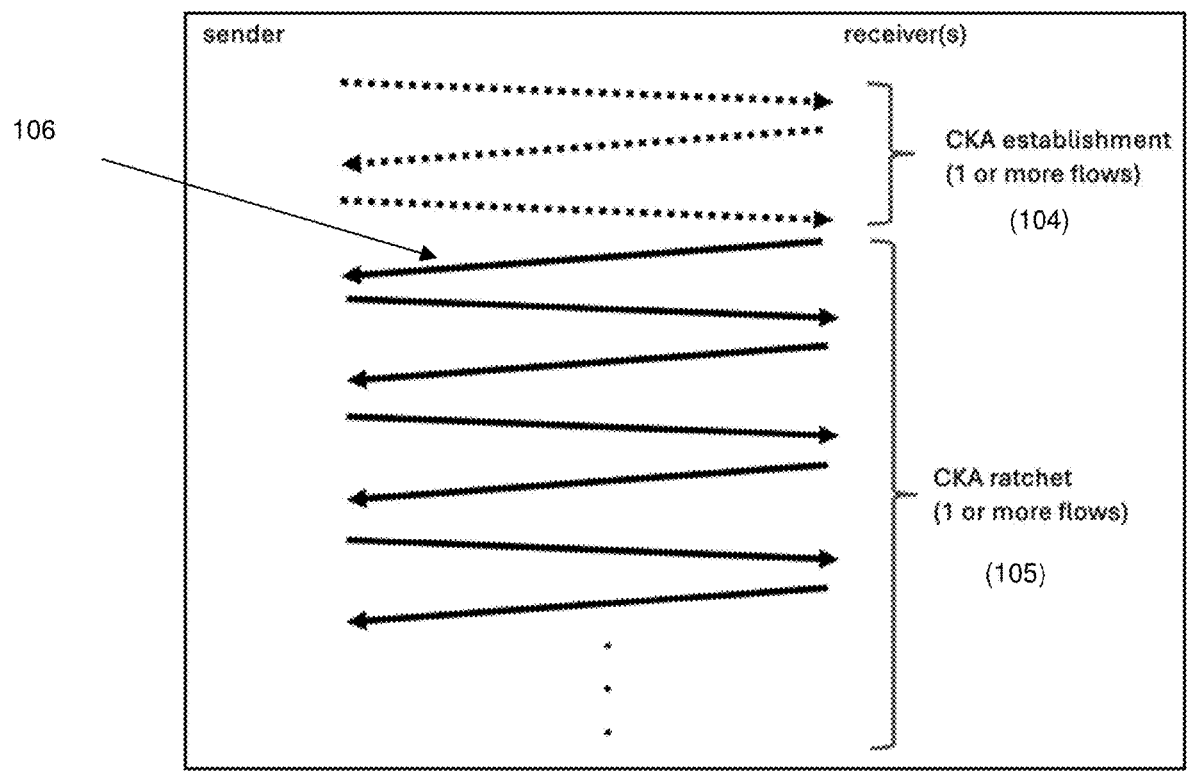
FIG. 2 illustrates a method for cryptographically securing communication systems between a plurality of communication devices according to an example embodiment of this disclosure, the method including a continuous key agreement (CKA) process, where after the initial CKA process establishment, keys can be updated through a key ratchet mechanism with defined or adjustable frequency.

As a specific type of PKI based protocols, Continuous Key Agreement (CKA) protocols support evolution of keying material over time using asymmetric keys. With reference to FIG. 2, illustrated is a method for providing secure/encrypted communication channels 106 between a plurality of communication devices, the method including a continuous key agreement (CKA) process, where after the initial CKA process establishment 104, keys can be updated through a key ratchet mechanism 105 with a defined or adjustable frequency.

Examples of CKAs include the Signal Protocol [Ref. 8] which is also used directly or adapted within other messaging protocol applications [Ref. 4] [Ref. 5] [Ref. 6] [Ref. 7], and the MLS protocol [Ref. 2]. There have been various analyses of CKA protocols [Ref. 10] [[Ref. 11] [Ref. 12] [[Ref. 13]. FIG. 2 illustrates one potential concept of a CKA.

Although PKI based key exchange protocols have used PSKs from other such protocol specifications, injection of a keyloader key has not been described, nor has integration of such fixed keys been looked at for the case of CKAs. This disclosure, and the example embodiments described herein, specifically provide a Hybrid PKI Keyloader (HPKL)

method and system including a protocol for integrating the security and use of keyloader keys and PKI based CKA protocols.

PKI based PSK derivation and use has been distinct from the use of keyloaders, where keys are generated and manually installed. This disclosure focuses on integration of these distinct components, describing a process for combining the mutual strengths of keyloaders and PKI based systems. The hybrid PKI keyloader method and system operates as follows: 1) symmetric keys are installed in hardware devices via use of keyloaders; and 2) these keys are then integrated into the PKI based protocols under pre-shared key (PSK) injects, where such protocols may allow for use of an exporter key from another system. To achieve the security advantages from both the keyloader's key and the PKI based key, the keys must be enmeshed such that an attacker that successfully breaks one key but does not have the other cannot break the resultant combination key.

Figure 3:
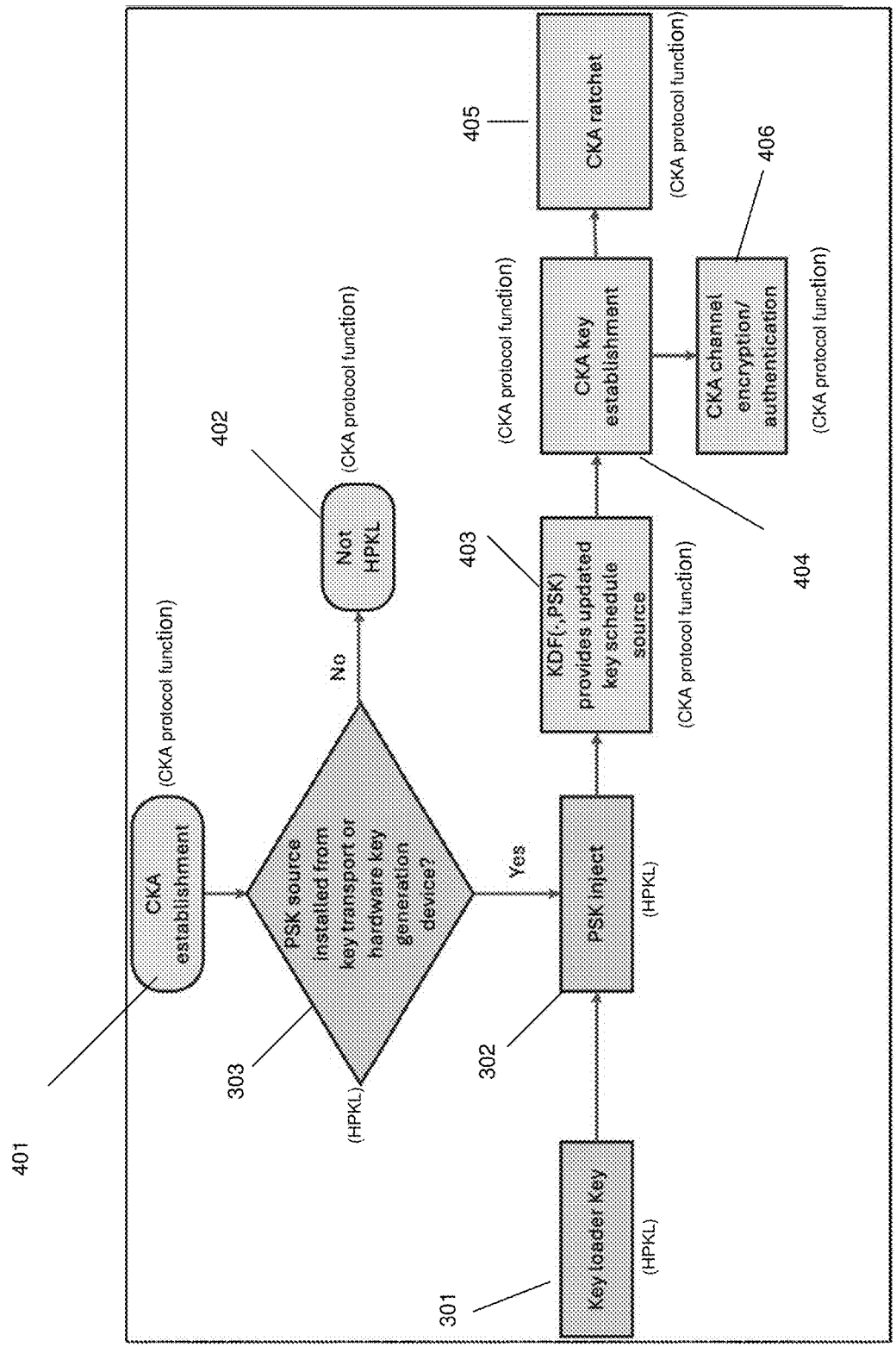
FIG. 3 is a flow chart of a hybrid PKI keyloader method illustrating the integration of a keyloader key into a CKA according to an example embodiment of this disclosure (Embodiment 1).
Figure 4:
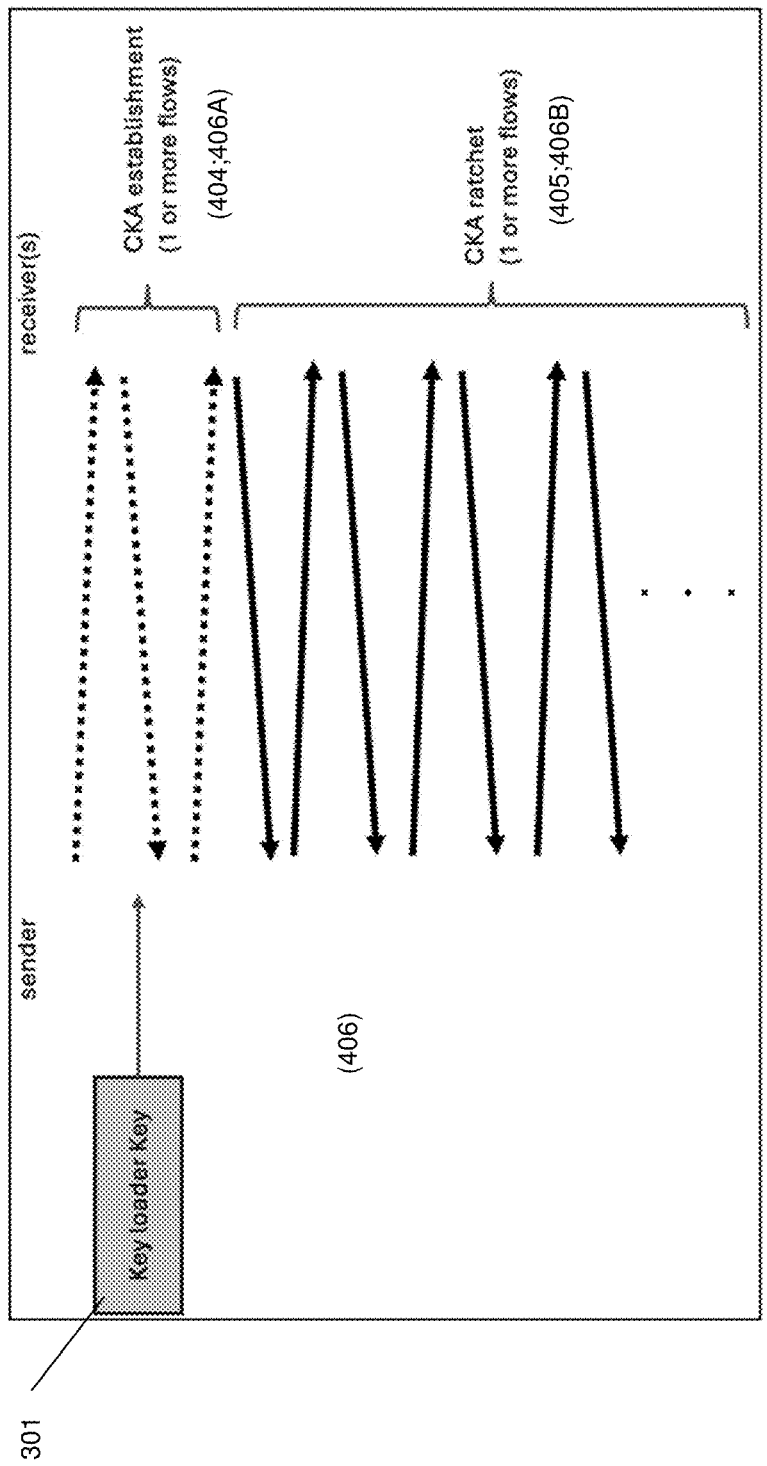
FIG. 4 is a flow chart illustrating an alternate view of the integration of a keyloader key into a CKA utilizing the process in FIG. 3.
Figure 5:
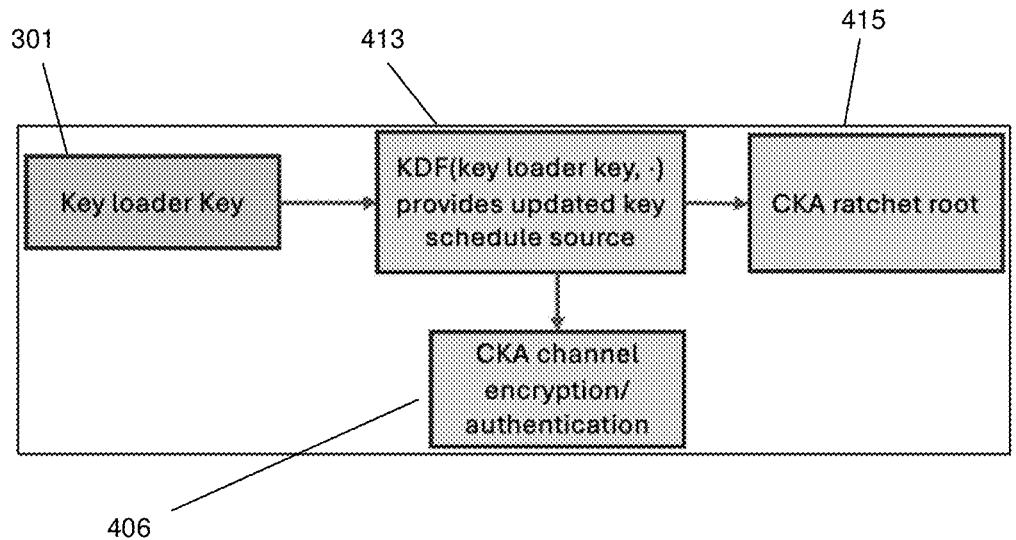
FIG. 5 is a flow chart of a hybrid PKI keyloader method illustrating a keyloader key initiation process for initiating a CKA according to an example embodiment of this disclosure (Embodiment 2).
Figure 6:
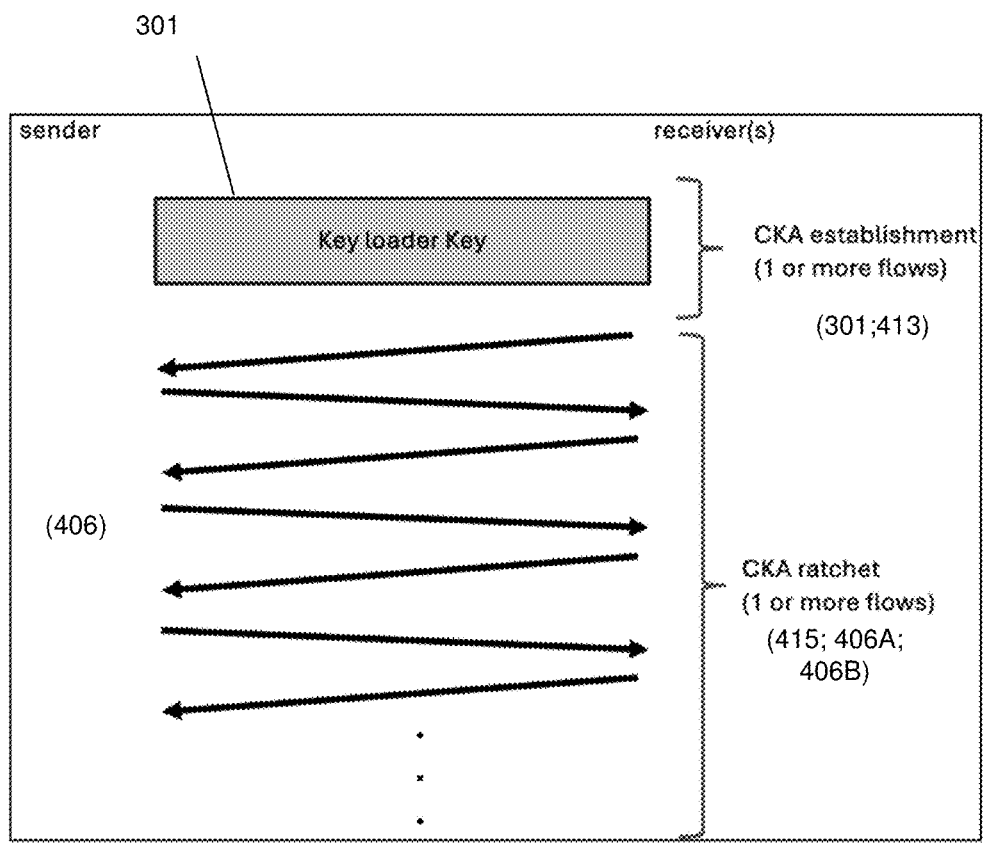
FIG. 6 is a flow chart illustrating an alternate view of the keyloader key initiation process in FIG. 5.

Thus, the resultant protocol can optionally:
1) combine the keyfill key with the PKI derived key, such as via a key derivation function (KDF). FIG. 3 is a flow chart illustrating the integration of a keyloader key into a CKA according this an example embodiment of this disclosure (Embodiment 1) and FIG. 4 is an alternative view of FIG. 3); or
2) alternatively, the keyloader key can be used directly as the initiating source of randomness for the CKA, e.g., replacing the need for a PKI based protocol derived initial root key. Further key ratchets are then derived through a PKI based system, potentially utilizing ephemeral PKI keys that are then KDF'd with the current root key. FIG. 5 is a flow chart illustrating a keyloader key initiation process for initiating a CKA according to this example embodiment of this disclosure (Embodiment 2) and FIG. 6 is an alternative view of FIG. 5.

With reference to FIGS. 3 and 4, shown is the method of Embodiment 1 of keyloader key CKA integration where FIG. 3 shows a method of injecting the keyloader key into the CKA and FIG. 4 is a flow chart illustrating an alternate view of the integration of a keyloader key into a CKA utilizing the process in FIG. 3.

As shown, a hybrid PKI key loader process includes a PSK injection process 302 that requires a keyloader key input 301 and PSK 303. A CKA protocol function process includes a CKA establishment process 401 and HPKL verification process 402, as well as a key derivation function 403, a CKA key establishment process 404, a CKA ratchet process 405 and a resulting CKA channel encryption/authentication process 406.

In operation, the PSK generation process 303 receives a manually entered keyloader key 301 and a PSK 303, where prior to execution of the PSK injection process 302, the CKA is established 401 and at the method verifies the PSK source is installed from a key transport or hardware key generation device.

Then, a KDF (.,PSK) process provides an updated key schedule source 403 and the KDF provided key is used by the CKA key establishment process to provide CKA channel encryption/authentication 406. A CKA ratchet process 405 generates a fresh key for every sent/received message.

In other words, provided is a method and system for cryptographically securing communication systems between a plurality of communication devices, the method including:
1) manually providing a pre-shared encryption and/or authentication key via one or more key loader devices to the communication devices;
2) using a public key infrastructure (PKI) based key exchange protocol, deriving a shared symmetric encryption and/or authentication key;
3) processing the pre-shared encryption and/or authentication key and the key exchange protocol derived shared symmetric encryption and/or authentication key to derive a combined encryption and/or authentication key which is based on a combination of the pre-shared encryption and/or authentication key and the PKI based exchange protocol derived shared symmetric encryption and/or authentication key; and
4) using the combined encryption and/or authentication key to encrypt and/or authenticate communications between the plurality of communication devices.

The processing includes processing the keyloader pre-shared encryption and/or authentication key as a pre-shared (PSK) inject into the PKI based key exchange protocol to generate the combined encryption and/or authentication key which is based on the combination of the pre-shared encryption and/or authentication key and the PKI based key exchange protocol derived symmetric encryption and/or authentication key.

With reference to FIGS. 5 and 6, FIG. 5 shows the method of Embodiment 2 initiating the CKA based on the keyloader key, and FIG. 6 is a flow chart illustrating an alternate view of the keyloader key initiation process in FIG. 5. Other variants of the above can utilize further KDF and hash-based middle steps in the integration process.

As shown, a hybrid PKI key loader process includes a keyloader key input 301 which initiates a key derivation function 413 to provide an updated key schedule source. A CKA protocol function process includes a CKA ratchet process 415 and a resulting CKA channel encryption/authentication process 406 which uses the KDF provided key to provide the resulting CKA channels 406A and 406B.

In other words, disclosed is a method for cryptographically securing communication systems between a plurality of communication devices, the method including:
1) manually providing a pre-shared encryption and/or authentication key via one or more key loader devices to the communication devices;
2) using a public key infrastructure (PKI) based protocol, processing the pre-shared encryption and/or authentication key to initiate the PKI based protocol to generate a combined encryption and/or authentication key based on the pre-shared encryption and/or authentication key; and
3) using the combined encryption and/or authentication key to encrypt and/or authenticate communications between the plurality of communication devices.

Figure 7:
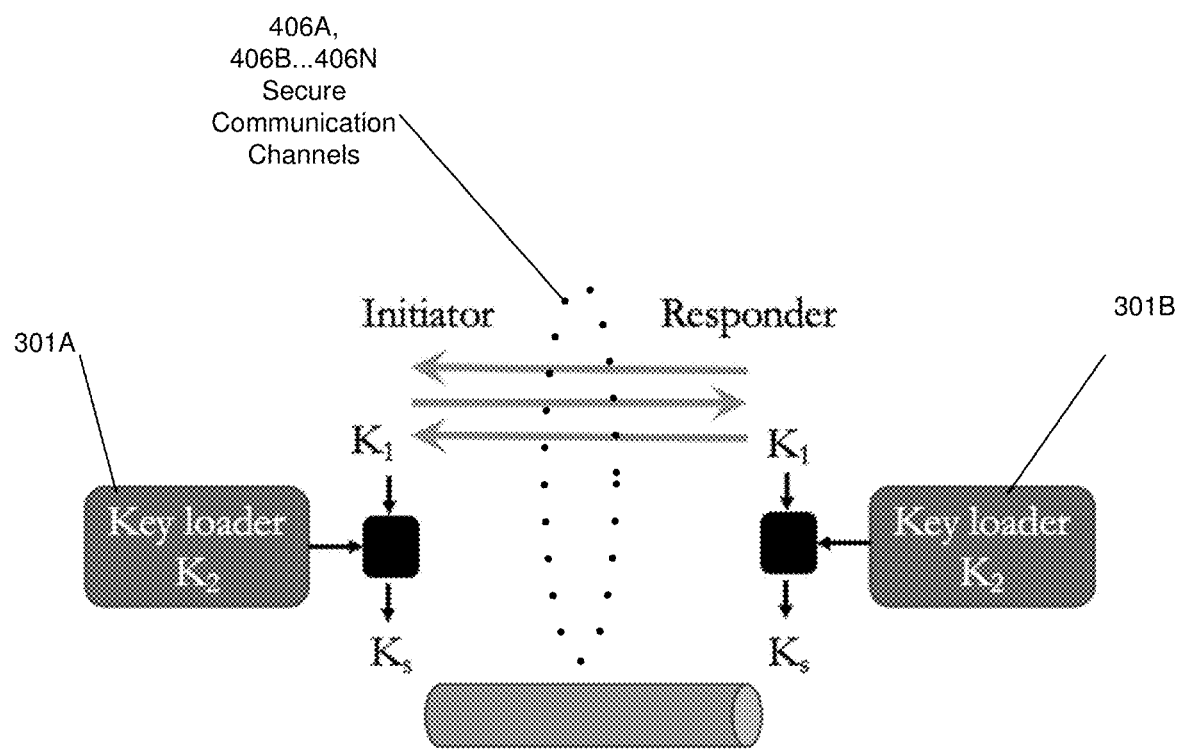
FIG. 7 illustrates a high level integration of a hybrid PKI keyloader/keyfill method for cryptographically securing communication systems between a plurality of communication devices according to an example embodiment of this disclosure, where the keyfill key $K_2$ is combined with the CKA protocol root key $K_1$ to result in a hybrid secure key $K_s$ that is then used as the key for a secure channel of communication.

With reference to FIG. 7, illustrated is a high level integration illustration of a keyloader/keyfill key method for cryptographically securing communication systems between a plurality of communication devices according to an example embodiment of this disclosure, where the keyfill key $K_2$ 301A is combined with the CKA protocol root key $K_1$ to result in the combination secure key Ks that is then used as the key for the secure channel for the initiating device, and the keyfill key $K_2$ 301B is combined with the CKA protocol root key $K_1$ to result in the combination secure key Ks that is then used as the key for the secure channel for the responding device. The combining function utilizes a KDF, or variant internal KDF (hash) steps or layered KDF steps.

Benefits and advantages of the disclosed methods and systems include, but are not limited to:

1) One time or infrequent manual keyfill loading (vs. frequent). The keyfill can be loaded once and the vulnerability window is then restricted due to the smaller window offered by the PKI based side. If occasional keyfill loading is desired, its frequency can be more safely reduced.
2) Safety and security in manual delays. In use-case environments where it is temporary difficult or unsafe for the operator to obtain or replace keyloader keys, the use window of the manual keyfill keys can be safely extended beyond a typical window until the environment is conducive.
3) Airgap reliability over PKI based protocols. In case of supply chain concerns or PRNG/RNG security concerns, the installation and mixing of keyfill keys with the locally, automatically generated keys allows for risk mitigation and equivalent or better security than that obtained by only the keyfill method-thus not only mitigating PKI risk but still improving on keyloader risk.

In the above descriptions, PKI based keys includes continuous key agreement protocols such as MLS [Ref. 2], Signal [Ref. 8], Wickr Secure Message Protocol, etc.

The Hybrid PKI Key Loader is thus a method of combining keys from key loader devices and a PKI based protocols to build secure communication channels. It improves on the security offered by manual installation of keys, such as in military systems, as well as improving on the security offered by industry and commercial sector PKI based protocols. It also improves efficiency and reduces delays through mitigating manual requirements.

According to this application, asymmetric digital signatures are used to address a primary concern with authentication from the back-end for updates. According to one equipment example, the encryption method provides protection from adversaries listening in (confidentiality) and provides a means to verify the identity of a sender (authenticity) and uniqueness of the transmission (replay protection).

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A method for cryptographically securing communication systems, the method comprising:
    by a plurality of communications devices;
    providing a pre-shared key via one or more key loader devices to two or more communication devices, wherein the pre-shared key is selected from the group of keys consisting of one or more of: a pre-shared key, an authentication key, or a combination thereof;
    deriving a shared symmetric key, based at least in part on a public key infrastructure (PKI), wherein the symmetric key is selected from the group of symmetric keys consisting of one or more of: an encryption key, an authentication key, or combinations thereof;
    processing the pre-shared key and the symmetric key to derive a combined key; wherein the combined key is a combination of the pre-shared key and the symmetric key;
    encrypting by using the combined key to encrypt communications between the one or more communication devices; and
    authenticating by using the combined key to authenticate communications between the one or more communication devices;
    wherein the processing includes processing the pre-shared key of the one or more keyloaders as a pre-shared (PSK) inject into a PKI based key exchange protocol to generate the combined key;
    wherein the shared symmetric key is derived from a continuous key agreement (CKA) protocol process;
    wherein the shared symmetric key is ratcheted;
    wherein the one or more key loader devices and the PKI based key exchange protocol are associated with a hybrid PKI key loader (HPKL) system independent from the CKA protocol process.

2. The method according to claim 1, wherein the shared symmetric key is derived from one or more session-based protocols.

3. The method according to claim 1, wherein the shared symmetric key is derived from one or more session-based protocols and pre-shared keys.

4. The method according to claim 1, wherein the shared symmetric key is updated by a ratcheting process of the one or more continuous session protocols.

5. The method according to claim 1, wherein the processing comprises one or more functions selected from the group comprising: key derivation function (KDF), a hash function, a KDF variant, a layered KDF, or a combination thereof to combine the pre-shared key and the shared symmetric key.

6. A non-transitory computer readable medium with computer executable instructions for cryptographically securing communication systems, the computer readable medium having executable instructions for:
    by a plurality of communications devices:
    providing a pre-shared key via one or more key loader devices to two or more communication devices, wherein the pre-shared key is selected from the group of keys consisting of one or more of: a pre-shared key, an authentication key, or a combination thereof;
    deriving a shared symmetric key, based at least in part on a public key infrastructure (PKI), wherein the symmetric key is selected from the group of symmetric keys consisting of one or more of: an encryption key, an authentication key, or combinations thereof;
    processing the pre-shared key and the symmetric key to derive a combined key; wherein the combined key is a combination of the pre-shared key and the symmetric key;
    encrypting by using the combined key to encrypt communications between the one or more communication devices; and
    authenticating by using the combined key to authenticate communications between the one or more communication devices;
    wherein the processing includes processing the one or more keyloader's pre-shared key as a pre-shared (PSK) inject into a PKI based key exchange protocol to generate the combined key;
    wherein the shared symmetric key is derived from a continuous key agreement (CKA) protocol process;
    wherein the shared symmetric key is ratcheted;
    wherein the one or more key loader devices and the PKI based key exchange protocol are associated with a hybrid PKI key loader (HPKL) system independent from the CKA protocol process.

* * * * *